Jan. 7, 1969    R. A. MYERS    3,420,089
VARIABLE PRESSURE DRAWPRESS AND METHOD
Filed Feb. 16, 1966    Sheet 1 of 3

INVENTOR.
RICHARD A. MYERS
BY J. Edwin Coates
-ATTORNEY-

United States Patent Office 3,420,089
Patented Jan. 7, 1969

3,420,089
VARIABLE PRESSURE DRAWPRESS AND METHOD
Richard A. Myers, Rolling Hills Estates, Calif., assignor, by mesne assignments, to McDonnell Douglas Corporation, Santa Monica, Calif., a corporation of Maryland
Continuation-in-part of application Ser. No. 321,472, Nov. 5, 1963. This application Feb. 16, 1966, Ser. No. 527,954
U.S. Cl. 72—351                  21 Claims
Int. Cl. B21d 22/22

This invention lies in the field of forming sheet metal by drawing it into desired shapes. It is particularly directed to a method of drawing which produces consistently uniform and usable parts and to apparatus for carrying out the novel method. This application is in part a continuation of my prior application Ser. No. 321,472, filed Nov. 5, 1963, now abandoned.

There is a large and growing demand for dome shaped members of sheet metal to be used as pressure tank ends in industry generally and in the aerospace field, where rocket motors and propellant tanks must withstand enormous pressures and no failures can be tolerated. Reliability demands that there be no wrinkles or significant wall thinning because the design dimensions are based on maximum allowable stresses with practically perfect parts. Thinning and wrinkling both produce localized weak areas which are liable to fail when subjected to working loads.

Domes have been formed by machining, forging, stamping, spinning, and drawing depending on the material used and the equipment available. Where medium to heavy sheets of metal, some of which might be called plates, are to be formed, drawing has been found to be very practical and in many cases the most economical method to employ. In conventional presses the method involves gripping the skirt or marginal portion of a disk of sheet metal between a pair of gripping rings and urging a ram against the central portion of the disk in a direction perpendicular to its plane. The ram is provided with a head shaped to correspond to the desired internal size and shape of the finished dome. As the ram moves forward the disk is drawn radially inward between the gripping rings against high resistance and gradually flows into a shape conforming to that of the ram head.

When the sheet metal flows readily this system is very satisfactory. However, domes for use in missiles and other very high pressure installations are usually made of very tough and rather thick material which has a very high resistance to deformation. A typical missile dome is about six feet in diameter and is made of 4340 steel about .200 inch thick. When deep drawings of such material are attempted in conventional draw presses the results are quite unsatisfactory. If moderate to small gripping forces are applied to the skirt, the sheet material tends to wrinkle. This is because the peripheral extent of the skirt must be reduced as the sheet moves radially inwardly to follow the punch and it piles up on itself. When this is prevented by very high gripping forces the resistance to radial movement is so high that unacceptable thinning of the metal results.

Another disadvantage of conventional presses is that the draw ring or other gripping member is usually urged toward the workpiece by a plurality of individual force-applying rods. These rods apply localized forces to spaced points about the periphery of the draw ring so that it grips the workpiece unevenly. This results in non-uniform resistance to movement of the metal along different radial lines and often produces uneven forming. In addition, the rods sometimes exert unequal forces on different portions of the draw ring. These difficulties can be alleviated to some extent by the use of very thick gripping rings but the increase in weight and expense is undesirable, and the use of very thick rings is only a partial solution.

The drawbacks of the prior art are overcome by the use of the present invention in which fluid pressure is used to produce a uniform unit gripping pressure at all points about the periphery of a first section of the gripping members which define a first pressure zone within the gripping zone and to produce another uniform unit gripping pressure at all points about the periphery of a second section of the gripping members which define a second pressure zone within the gripping zone. In most cases where severe forming is to be accomplished, three or more distinct pressure zones are established.

In one preferred form of the invention this is accomplished by placing in opposing relation to a draw ring a thin, substantially flat bladder made up of two sheets of thin sheet metal, preferably stainless steel. These sheets normally have the same planform as the draw ring and are provided with a generally central opening to permit them to surround the forming zone. The sheets are roll-welded together at their inner and outer margins and along one or more peripheral lines spaced between the inner and outer margins to divide the assembly into a plurality of individually radially spaced peripheral pressure chambers, each connected by an individual conduit to a separate source of fluid pressure. The sources are controlled to provide a different unit pressure in each chamber. The draw ring and bladder are held in spaced relation facing the two surfaces of the skirt of the workpiece and preselected pressures are applied to the various chambers to cause slidable gripping of the workpiece skirt during the forming operation. While the bladder can be used in direct contact with the workpiece, the rate of wear is rather high and it is preferable to provide a wear plate between the bladder and the workpiece. Although the wear plate is tough and relatively thick it is resilient enough to transmit the differing unit pressures individually to the workpiece.

In another preferred form of the invention, individual unit pressures are produced by providing a support plate in one face of which are formed a plurality of peripheral channels, one for each desired pressure zone. In each channel a peripheral ring is mounted for sliding movement perpendicular to the plane of the plate. Separate sources supply pressure fluid to the channels to force the rings outwardly and apply pressure to the workpiece. The rings may be provided with seals and the fluid may be fed directly to the channels, or the rings may be unsealed and the fluid may be supplied to peripheral tubes in each channel underlying the rings. While the rings can withstand a great deal more wear than the bladder it is preferable to provide a wear plate in this arrangement also.

The unit pressures in the various zones may be pre-set or they may be adjusted during the forming operation. Ordinarily the pressure at the innermost pressure zone is highest and is of the order of 1000 to 2000 pounds per square inch, and the pressure at the outermost zone is lowest and is a few hundred pounds per square inch. When a typical disk is being formed, the peripheral shrinkage flow is less at the outer margin than at the portion adjacent the forming zone. Therefore the gripping pressure should be less in the outermost pressure zone and increase progressively inward, with the total resistance to radial inward movement being just great enough to force the workpiece to conform exactly to the contour of the punch head as it is drawn. A much higher pressure is needed at the innermost zone to prevent wrinkling. In some cases it has been found desirable to increase the pressure at the innermost zone as the metal moves radially inwardly and the outer zones no longer exert any restraint.

Various other advantages and features of novelty will bcome apparent as the description proceeds in conjunction with the accompanying drawings, in which.

Figure 1:
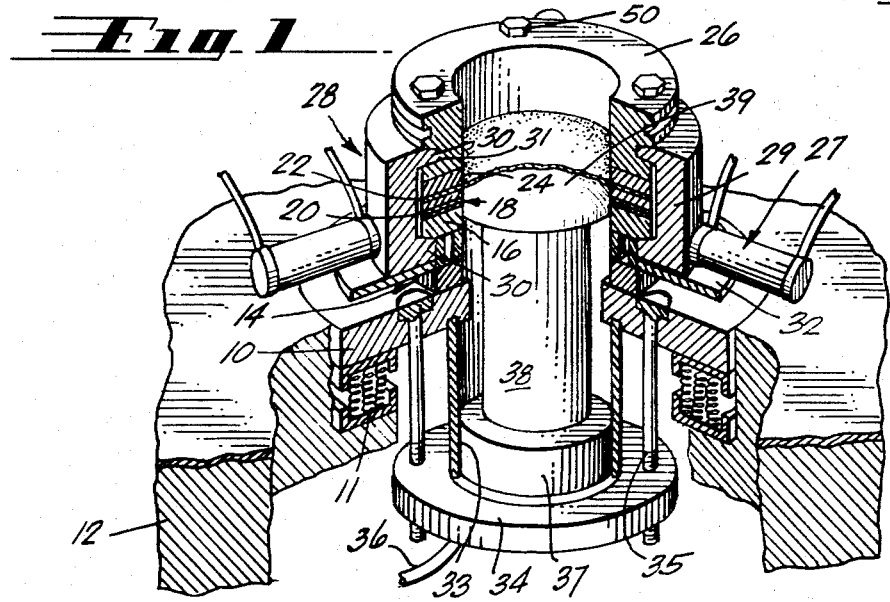
FIGURE 1 is a perspective view, partly in section, of a draw press incorporating the invention.

A draw press incorporating the principal features of the invention and adapted to operate in accordance with the new method is illustrated in FIGURE 1. A base 10 comprising a heavy annular steel plate is mounted on an annular shock absorber 11 set in a recess in floor 12, and serves to support the principal components of the press. A spool 14 including a lower annular plate and a pair of spaced cylinders is mounted on and welded to base 10 and supports the gripping assembly in spaced relation to the base. Annular support body or plate 16 is welded to the upper ends of the cylinders and completes the spool.

An expandable first gripper member 18 lies on the upper surface of the support plate and is surmounted by annular wear plate 20. The skirt portion of workpiece 22 lies between wear plate 20 and the second gripper body or member, draw ring 24, which is secured to backup ring 26. The components of the gripping mechanism are held in assembled relation by a plurality of clamp ring sections 28, each of which includes a web 29 and flanges 30, the lower flange engaging the underside of support plate 16 and the upper flange seating in annular groove 31 in backup ring 26. The clamp ring sections are moved into and out of clamping position by hydraulic servos 27 and are supported by ring 32 which is welded to the spool 14.

The components just described surround and define a central forming zone in which a forming ram reciprocates vertically to engage and deform the workpiece 22 into the desired shape. The cylinder for the ram includes a cylindrical section 33 mounted between base 10 and a lower end plate 34, all held in assembled relation by bolts 35. Pressure fluid is supplied to the cylinder from a source, not shown, through conduit 36. The ram itself includes a piston 37, piston rod 38, and ram head 39. When the ram is raised after contacting the central portion of the workpiece 22 the skirt of the workpiece is gradually drawn inwardly against the resistance of the gripper members.

Figure 2:
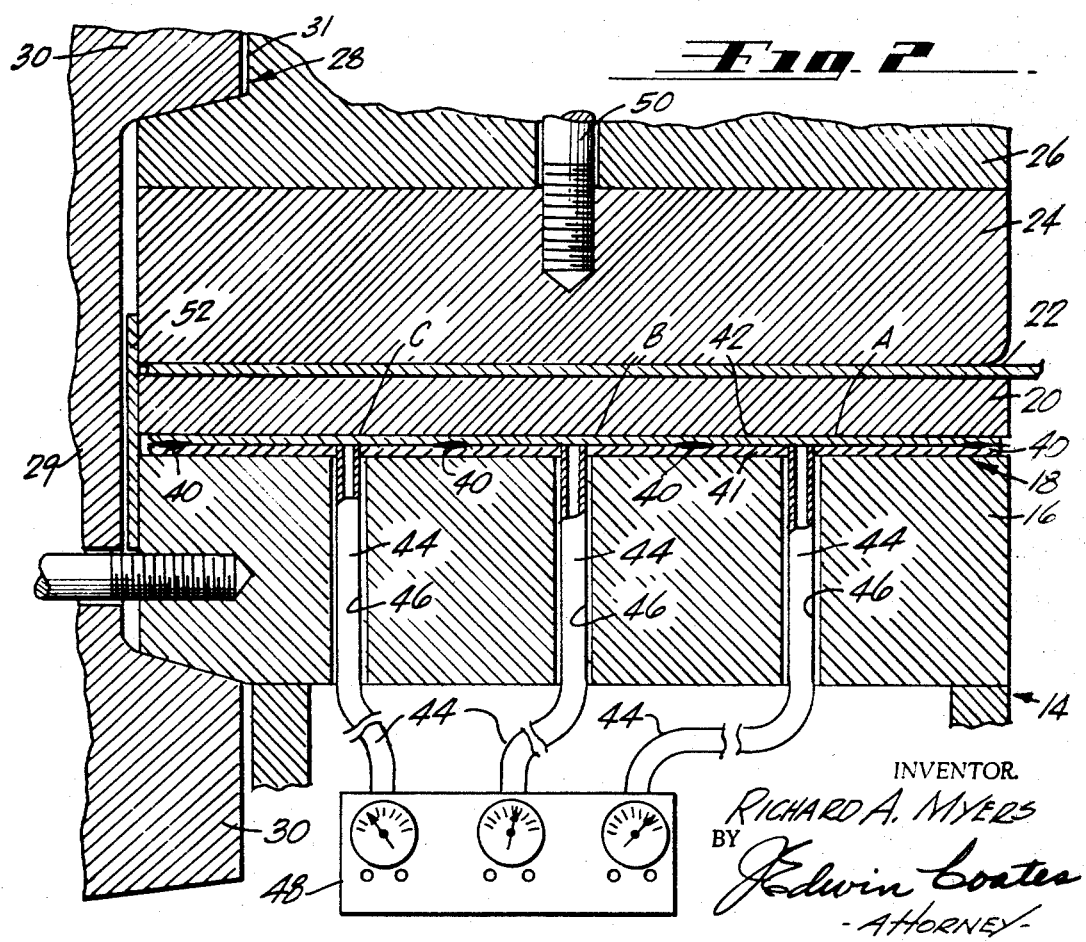
FIGURE 2 is a sectional view in elevation of a portion of the gripping assembly of FIGURE 1 illustrating the manner in which varying gripping pressures are applied to the workpiece.

The entire gripping mechanism is illustrated in more detail in FIGURE 2, where it will be seen that the expandable gripper member 18 is a multi-section bladder made up of two thin sheets of metal 41 and 42 welded together along their inner and outer margins and along two intermediate peripheral lines as indicated at 40 to form three separate and distinct fluid-tight pressure chambers A, B, and C. A conduit 44 is welded to an opening in the wall 41 of each chamber and leads through passageways 46 in support plate 16 to a fluid pressure source 48. The source includes a fluid reservoir and a high pressure pump with branch outlets connected to each of the conduits 44. Each conduit has its own control valves and pressure gauge and thus the operator may set and observe the pressures individually. Draw ring 24 is secured to backup ring 26 by several bolts 50. An annular guide ring 52 is secured to support plate 16 and guides the wear plate 20, the workpiece 22, and the draw ring 24 into the proper position for the forming operation.

At the commencement of a typical forming operation the press is open, with the clamp ring sections radially withdrawn and the backup ring and draw ring raised to provide the necessary clearance, and the head 39 of the ram or punch is in lowered position. A sheet or disk of metal 22 is now laid on the wear plate 20 and guided to the proper starting position by guide ring 52 after those peripheral portions of the disk which will contact the gripper members have been coated with drawing wax or other suitable lubricant. The draw ring and backup ring are now lowered into place and clamp ring sections 28 are moved radially inward to engage the support plate and backup ring to lock the gripping mechanism against axial separation, with the gripper members in contact with the opposed surfaces of workpiece 22. The contacting faces of the wear plate and draw ring are very smooth to avoid abrasion of the workpiece and to provide very uniform sliding resistance to radial movement of the workpiece skirt.

When the assembly is completed, fluid pressure is applied to the pressure chambers A, B, and C, with the highest pressure in A and the lowest in C. Since the parts are already in low pressure contact, the axial expansion of the chambers is very slight to accomplish high pressure contact. Their pressures are transmitted through corresponding areas of the wear plate to the workpiece. Although the wear plate is tough and relatively thick it is elastic enough to respond separately to the various pressures, particularly because the relative axial movement of the portions in the different pressure zones is insignificant. Consequently the unit pressures exerted by the wear plate in each pressure zone are substantially identical to those exerted by the corresponding pressure chambers. The ram is now moved upward and head 39 engages the central portion of the workpiece, raising it out of its original plane against the resistance offered by the gripper members and forcing it to conform to the contour of the ram head.

Chamber A exerts the highest unit and total pressure because the greatest resistance is necessary in this area to force the essential radial and peripheral flow of the metal as it changes from flat to double curvature to maintain constant thickness and prevent wrinkling. Chamber B exerts less unit and total pressure because the inner pressure zone resists a very large portion of the total radially inward force applied by the ram to the workpiece. Chamber C exerts a relatively low pressure because the outermost portion of the workpiece undergoes the least amount of radial and lateral flow. Generally the pressure in chamber A is of the order of magnitude of 1000 to 2000 p.s.i., in chamber B is several hundred p.s.i. less, and in chamber C is of the order of several hundred p.s.i. The optimum pressures depend on the thickness and type of material being formed, the shape into which it is being formed, including its depth, diameter, and geometric type, and other factors. The pressures may be determined experimentally and have been so determined for the following two operational examples.

To pre-form a 0.076 inch thick, 49 inch diameter, disk of No. 4340 high carbon steel so that the center portion was drawn 6 inches deep into the curvature of a 29 inch diameter dome, the following oil pressures were used: 1000 p.s.i. in the inner bladder chamber A, 900 p.s.i. in the middle bladder chamber B, and 300 p.s.i. in the outer chamber C. To final-form the pre-formed dome (after it had been annealed) to a drawn height of 16 inches the following pressures were employed: 1200 p.s.i. in the inner chamber A, 1050 p.s.i. in the middle chamber B, and 250 p.s.i. in the outer chamber C.

To form a 0.109 inch thick disk of No. 4340 high carbon steel into a dome of Cassinian shape, 36 inches in diameter, drawn height 20 inches, a bladder with four chambers was used. The oil pressures used were 1900 p.s.i. in the inenrmost chamber, 1800 p.s.i. in the second from innermost chamber, 1000 p.s.i. in the third from innermost chamber, and 500 p.s.i. in the outermost chamber.

The bladder itself is generally constructed of thin sheets of steel. Two sheets of 0.032 inch thick No. 347 stainless steel, roll-seam-welded together with 3/16 inch wide seams to form the chambers, have been found to be satisfactory.

While the description has been directed to the forming of uniform parts from circular workpieces it is to be noted that odd shaped parts may be formed very effectively in accordance with the invention since the planform of the bladder and its individual chambers can be tailored readily to any particular part, thus enabling the application of specially controlled pressures in difficult forming areas. Parts of tapered thickness may be formed readily with this system by special patterning of the bladder and by providing appropriate pressures at different areas to compensate for the differences in metal thickness.

Figure 3:
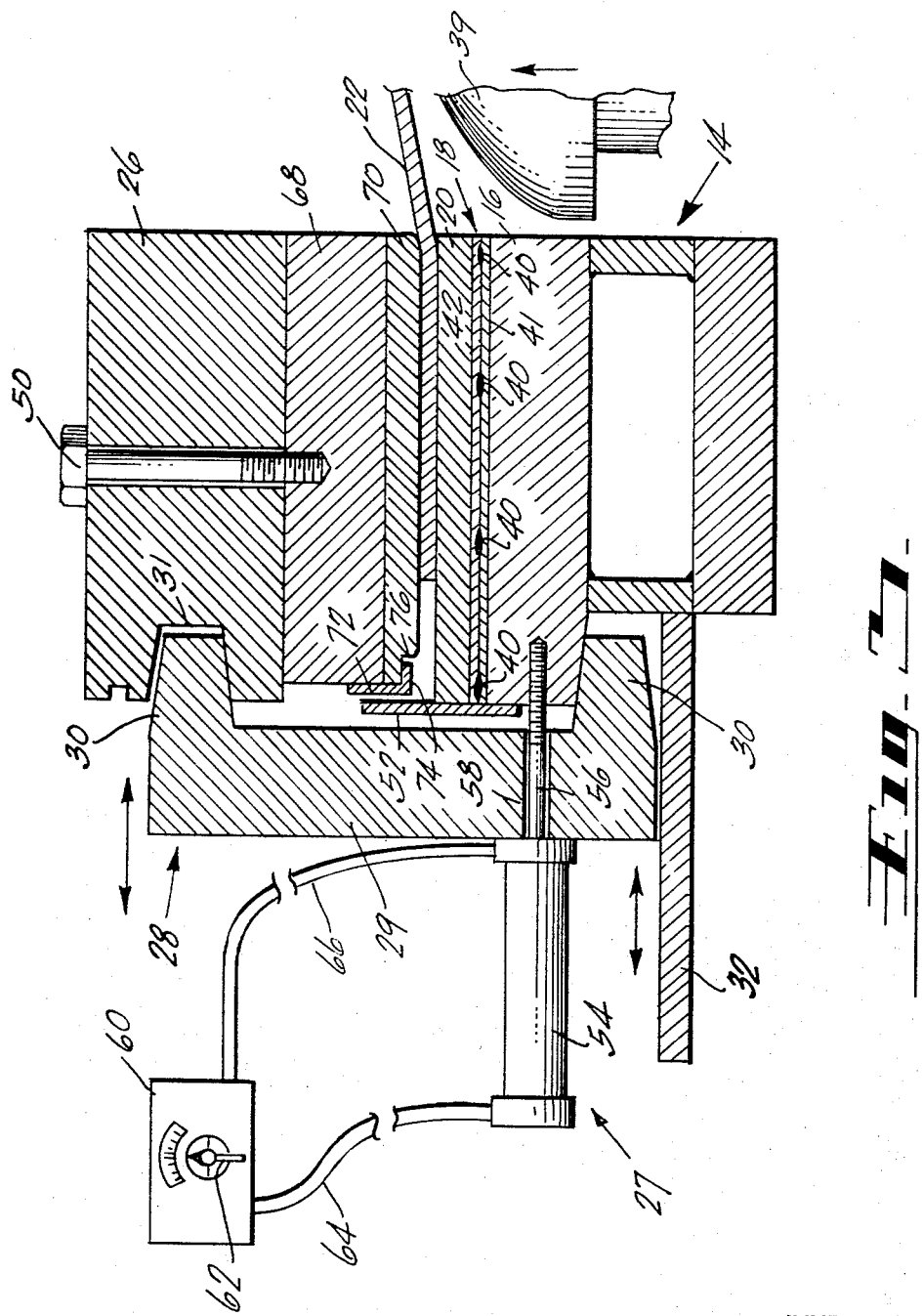
FIGURE 3 is a view similar to FIGURE 2, showing a modified arrangement.

The gripping assembly of FIGURE 2 is illustrated in more detail in FIGURE 3, together with a modified form of draw ring. It will be seen that the servo 27 includes a pressure fluid cylinder 54 secured to the outer wall of each clamp ring section 28, a piston, not shown, and a piston rod 56. The piston rod reciprocates freely through a passage 58 in web 29 and its inner end is threadedly secured in support plate 16. When pressure fluid enters the outer end of the cylinder it exerts a rightward force on the piston. Since rod 56 is anchored in support plate 16, the result is that the cylinder and the attached clamp ring section 28 move to the left, the latter being slidably supported by ring 32, and the gripping mechanism assembly is free to be separated vertically. Source 60 includes a fluid reservoir and pump and a three-way valve 62 to direct the pressure fluid alternatively through lines 64 and 66 to actuate servo 27 in opposite directions.

The draw ring assembly of FIGURE 3 includes a relatively thick primary ring 68 which is permanently attached to the backup ring 26 by bolts 50 and a relatively thin secondary ring 70 which is removably carried by ring 68 by means of an annular angle member 72. The latter is removably secured to the margin of ring 68 by a series of bolts, not shown, and its horizontal flange 74 fits into a recess 76 in the margin of ring 70 to avoid gripping contact with workpiece 22. The purpose of this modification is twofold. When ring 70 wears to a point where it can no longer be used it can be readily replaced by a new ring with minimum expenditure for material. Of more importance, ring 70 can be quickly interchanged with other rings of different thicknesses to accommodate workpieces of different thicknesses. This avoids the inconvenience and expense of stocking a large number of very thick draw rings such as 24 of FIGURE 2 varying only slightly from each other in thickness.

Figure 4:
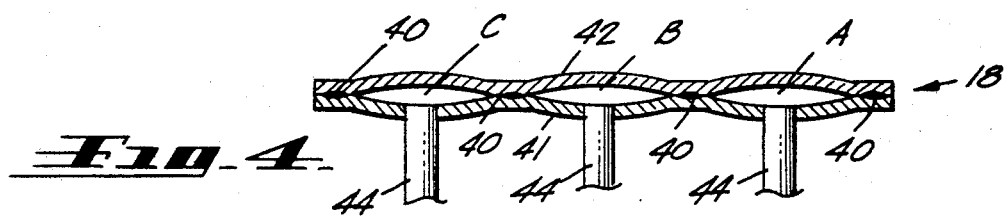
FIGURE 4 is a sectional view of the bladder type gripping member as expanded in use.

The chambers A, B, and C of bladder ring 18 are shown in expanded condition in FIGURE 4. The expansion is greatly exaggerated for clarity of illustration, the total axial movement in most cases being only a few thousandths of an inch. However, one or more of the bladders may well expand to this extent to grip various portions of a workpiece having various thicknesses. As mentioned previously, sheet 42 may contact a workpiece directly when the gripping load is small, but ordinarily it is preferable to employ a wear ring as described.

Figure 5:
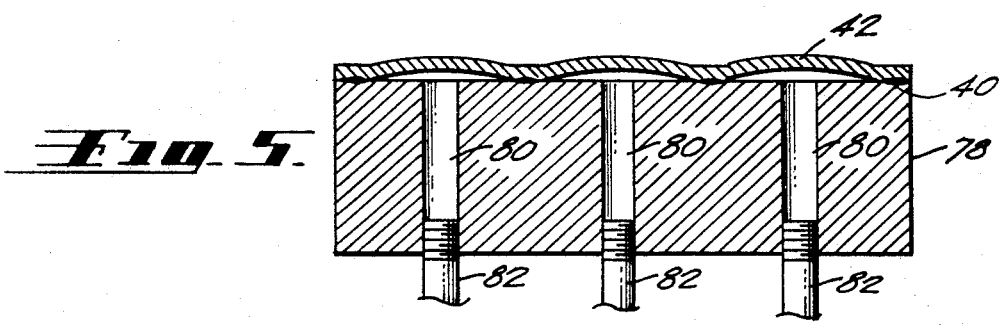
FIGURE 5 is a view similar to FIGURE 4, showing a modified gripping member.

In some cases the lower sheet 41 may be omitted and upper sheet 42 is then welded directly to support plate 78 which is formed with passages 80 communicating with the pressure chambers and with supply conduits 82 as shown in FIGURE 5. This assembly directly replaces support plate 16 in FIGURES 1 to 3.

Figure 6:
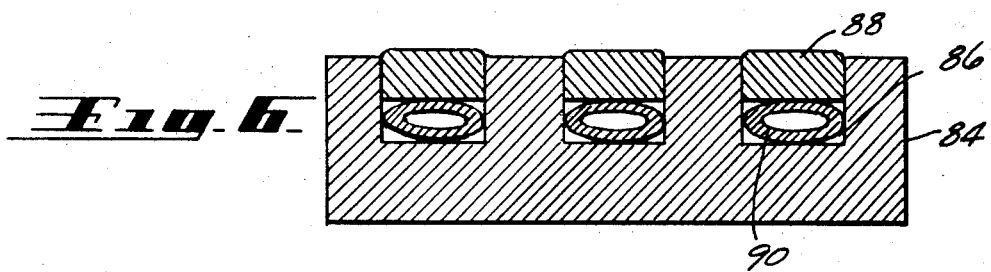
FIGURE 6 is a view similar to FIGURE 4, showing another modified gripping member.

In FIGURE 6, another type of support plate 84 is provided in its upper face with peripheral channels 86 to receive pressure rings 88 which are axially movable. Metal conduits or tubes 90 are located in the bottom of each channel and may be oval or rectangular. The tubes are individually supplied with pressure fluid through conduits, not shown, to expand and force rings 88 outwardly to apply individual forces to the overlying portions of the wear plate.

Figure 7:
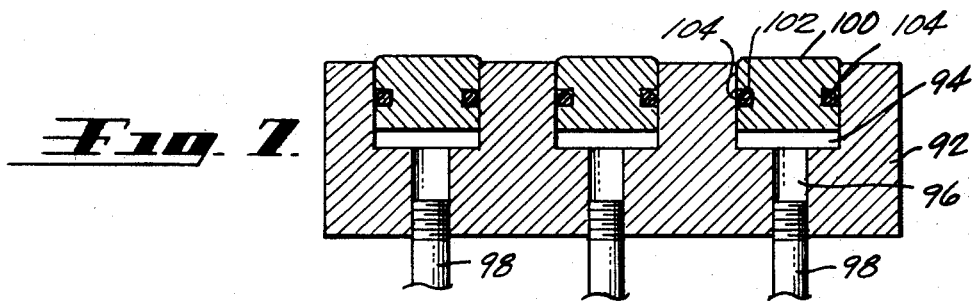
FIGURE 7 is a view similar to FIGURE 4, showing a still further modified gripping member.

The support plate 92 of FIGURE 7 is provided on its upper face with peripheral channels 94 similar to those of FIGURE 6. In this case, passages 96 communicate with the channels and with conduits 98 to supply individually controlled pressure fluid to each channel. Pressure rings 100 are mounted in the channels for axial movement and are provided with peripheral grooves 102 in each side wall carrying peripheral sealing means 104 such as O-rings. They therefore act directly as pistons and may be individually forced outward by the fluid pressure in their respective channels.

The forms of FIGURES 6 and 7 may also be substituted directly into the press of FIGURES 1 to 3. The support plates may be annular or of other planform, and the pressure rings may also be annular or of other planform regardless of the planform of the support plates. They are shown as occupying a lesser radial extent than the bladder but it will be apparent that they may be made as wide as desired with only a minimum channel wall thickness between them. These pressure rings also may contact the workpiece directly or be surmounted by a wear ring as in the previous examples.

It will be apparent to those skilled in the art that various changes may be made in the construction and arrangement of parts and in the method as disclosed herein without departing from the spirit of the invention, and it is intended that all such changes shall be embraced within the scope of the following claims.

I claim:
1. Apparatus for forming sheet metal, comprising: a punch movable along an axis generally transverse to the plane of a workpiece to be formed and establishing a forming zone; means located laterally adjacent to said forming zone and establishing opposed gripping zones; said means including gripping members relatively movable toward each other in a direction substantially parallel to the axis of movement of said punch to engage and slidably grip marginal portions of said workpiece; said gripping members including separately controllable pressure means to apply different degrees of workpiece gripping pressures at selected portions of areas successively spaced outwardly from said forming zone in a pressure application mode related to the forming configuration of said punch; and holding means to hold said gripping members in workpiece gripping relation and in axially fixed relation to each other throughout a forming operation.

2. Apparatus as claimed in claim 1; said controllable means including a thin planar bladder of sheet metal having two layers secured together along their inner and outer marginal edges and along at least one intermediate line of division to define a plurality of laterally adjacent expandable compartments; and further including separate conduit means communicating with each compartment and separately controllable pressure fluid supply means communicating with each of said conduit means.

3. Apparatus for forming sheet metal comprising: a punch movable along an axis normal to the plane of a workpiece to be formed and establishing a forming zone; opposed gripping members located laterally adjacent to said forming zone and relatively movable toward each other in a direction parallel to the axis of movement of said punch to establish a gripping zone extending laterally outward from said forming zone for slidably gripping marginal portions of said workpiece; fluid pressure means to apply and maintain a limited number of zones of different clamping pressures at areas successively spaced outwardly from the forming zone; and wear plate means disposed against and covering said pressure means to provide a smooth wear resisting surface to engage said workpiece; said wear plate means being locally yieldable in an unit pressure in the inner zone is of the order of magnitude of thousands of pounds per square inch and the unit pressure in the outer zone is of the order of magnitude of hundreds of pounds per square inch.

18. A bladder clamp means for holding workpieces in a drawpress comprising: a ring shaped bladder support including a flat surface; a ring shaped bladder positioned on said flat surface, said bladder including two thin sheets of a flexible material, each sheet having a ring shape, said sheets joined together at spaced locations to form at least two radially spaced chambers of annular shape; a backup ring means disposed on a side of said bladder opposite said bladder support for supporting one side of a workpiece; a wear plate of ring shape disposed on said bladder for directly contacting workpieces, said wear plate of sufficient thinness to flexibly deform under clamping pressures produced by said bladder, sufficiently to apply different pressures to workpiece portions opposite different chambers of said bladder; and brackets adapted for clamping said bladder support and backup ring to hold said bladder support, bladder, wear plate, backup ring, and a workpiece disposed between said wear plate and backup ring, tightly together.

19. A method for drawing a sheet workpiece comprising: clamping said workpiece on a peripheral portion which extends around said workpiece and covers an area extending a distance from the workpiece edge, between a first holding means and a wear plate backed up by a bladder having an inner and outer chamber; applying hydraulic fluid under a first pressure to said inner chamber of said bladder so as to apply approximately said first pressure to the portion of said workpiece near or immediately opposite said inner chamber; applying hydraulic fluid under a second pressure to said outer chamber of said bladder, said second pressure being less than said first pressure, so a to apply approximately said second pressure to the portion of said workpiece immediately opposite said outer chamber; and drawing said workpiece while maintaining said pressures in said bladder, whereby a relatively wrinkle-free, and minimally thinned drawn part is obtained.

20. Apparatus as claimed in claim 1; said controllable means including a plurality of laterally adjacent expandable compartments carried by the gripping means at one side of the workpiece; and further including separate conduit means communicating with each compartment, and separately controllable pressure fluid supply means communicating with each of said conduit means.

21. Apparatus for forming sheet metal comprising: a punch movable along a vertical axis normal to the plane of a workpiece to be formed and establishing a forming zone; means extending peripherally around said forming zone and establishing a gripping zone extending laterally around said forming zone; said means comprising a first, lower, unitary rigid support body having a horizontal upper planar workpiece-opposing surface and having a vertical passage therethrough to surround the forming zone, and a second, upper, unitary rigid gripper body having a horizontal lower planar workpiece-opposing surface and having a vertical passage therethrough to surround the forming zone; said support body being stationary and said gripper body being movable toward said support body to enter into slidable gripping engagement with a workpiece located between them; means to hold said bodies in axially fixed relation to each other throughout a forming operation; and multiple peripheral force-applying means carried by said support body at its workpiece-opposing surface and adapted to be individually urged away therefrom toward said gripper body by individually applied separately controllable fluid pressure to establish differential peripheral pressure zones in areas located successively outward of the forming zone; all of said multiple force-applying means being axially opposed to said unitary gripper body; the fluid pressure to all of said force-applying means being separately controllable at all times throughout the forming operation to vary the pressures or to maintain them constant.

References Cited

UNITED STATES PATENTS

| 971,771 | 10/1910 | Meloon | 269—22 |
| 1,665,827 | 4/1928 | Tillmann | 277—34 |
| 2,331,491 | 10/1943 | Menkin | 72—351 |
| 2,581,663 | 1/1952 | Ingersoll | 72—350 |
| 2,660,074 | 11/1953 | Wilson | 269—22 |
| 2,775,869 | 1/1957 | Pointer | 277—34.3 |
| 2,843,071 | 7/1958 | Kitzinger | 72—351 |
| 2,873,628 | 2/1959 | Stuart | 269—22 |
| 2,989,019 | 6/1961 | Van Sciver | 72—351 |
| 3,140,087 | 7/1964 | Heath et al. | 269—22 |
| 2,192,778 | 3/1940 | Stacy | 72—351 |

FOREIGN PATENTS

| 138,842 | 2/1903 | Germany. |
| 730,286 | 5/1955 | Great Britain. |
| 280,900 | 5/1952 | Switzerland. |

RICHARD J. HERBST, *Primary Examiner.*

U.S. Cl. X.R.

269—22